United States Patent
Hoppe et al.

(10) Patent No.: US 9,809,885 B2
(45) Date of Patent: Nov. 7, 2017

(54) METHOD FOR COATING A SLIDING ELEMENT AND SLIDING ELEMENT, IN PARTICULAR A PISTON RING OR CYLINDER LINER OF AN INTERNAL COMBUSTION ENGINE

(75) Inventors: Steffen Hoppe, Overath (DE); Manfred Fischer, Leichlingen (DE); Marcus Kennedy, Dusseldorf (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 1260 days.

(21) Appl. No.: 13/124,709

(22) PCT Filed: Oct. 15, 2009

(86) PCT No.: PCT/EP2009/063472
§ 371 (c)(1),
(2), (4) Date: Jul. 11, 2011

(87) PCT Pub. No.: WO2010/043669
PCT Pub. Date: Apr. 22, 2010

(65) Prior Publication Data
US 2011/0256366 A1    Oct. 20, 2011

(30) Foreign Application Priority Data

Oct. 16, 2008  (DE) ........................ 10 2008 042 896

(51) Int. Cl.
| B32B 7/02 | (2006.01) |
| F02F 1/00 | (2006.01) |
| F16J 9/26 | (2006.01) |
| C23C 30/00 | (2006.01) |
| C23C 28/04 | (2006.01) |
| F16J 10/04 | (2006.01) |
| C23C 28/00 | (2006.01) |

(52) U.S. Cl.
CPC ............ *C23C 30/00* (2013.01); *C23C 28/046* (2013.01); *C23C 28/343* (2013.01); *C23C 30/005* (2013.01); *F16J 9/26* (2013.01); *F16J 10/04* (2013.01); *C23C 28/34* (2013.01); *Y10T 428/12486* (2015.01); *Y10T 428/12493* (2015.01); *Y10T 428/2495* (2015.01)

(58) Field of Classification Search
CPC ....... C23C 28/00–28/44; C23C 30/00–30/005; F16J 9/26; F16J 10/04; Y10T 428/2495; Y10T 428/12486; Y10T 428/12493
USPC ............... 428/212–213, 215, 217, 220, 323, 428/688–689, 698, 701–702, 704, 699, 428/544, 566, 627, 624
See application file for complete search history.

(56) References Cited

U.S. PATENT DOCUMENTS

| 5,352,493 A * | 10/1994 | Dorfman et al. ............ 427/530 |
| 7,160,616 B2 * | 1/2007 | Massler et al. ............... 428/408 |
| 8,178,213 B2 | 5/2012 | Werger |
| 2007/0254187 A1 * | 11/2007 | Yamamoto et al. ........ 428/698 |
| 2009/0001669 A1 | 1/2009 | Hoppe et al. |

FOREIGN PATENT DOCUMENTS

| CN | 101276601 A | 10/2008 |
| EP | 1980645 A1 | 10/2008 |
| JP | 2004010923 | 1/2004 |
| JP | 2004018979 A | 1/2004 |
| JP | 2004238696 A | 8/2004 |
| KR | 20070105895 A | 10/2007 |
| WO | WO2006/125683 A1 | 11/2006 |
| WO | WO2007/020139 A1 | 2/2007 |
| WO | 2008011642 A2 | 1/2008 |

OTHER PUBLICATIONS

"Concurrent". Merriam-Webster Dictionary, http://www.merriam-webster.com/dictionary/concurrent. Retrieved Jun. 27, 2015.*
Gorishnyy et al. "Physical and mechanical properties of reactively sputtered chromium boron nitride thin films". Thin Solid Films, 445 (2003); pp. 96-104.*
Voevodin A A et al: "Recent advances in Hard, Tough, and Low Friction Nanocomposite Coatings", Tsinghua Science and Technology, Tsinghua University Press, Beijing, CN (2005); pp. 665-671.
Chang Y-Y et al: "Characterization of Nitrogen-Doped a-C:H Films Deposited by Cathodic-Arc Activated Deposition Process" Diamond na dRelated Mateiral, Elsevier Science Publish (2003); pp. 2077-2082.
Pal S K et al: "Effects of N-Doping on the Microstructure, Mechanical and Tribological Behavior of Cr-DLC Films" Surface and Coatings Technology, Elsevier, Amsterdam, NL (2007); pp. 7917-7923.
Voevodin A A et al: "Tribological Performance and Tribochemistry of Nanocrystalline WC/Amorphous Diamond-Like Carbon Composites", Thin Solid Films, Elsevier-Sequoia S.A. (1999); pp. 194-200.
Voevodin A A et al: "Nanocrystalline WC and WC/a-C Composite Coatings Produced From Intersected Plasma Fluxes at Low Deposition Temperatures" Journal of Vacuum Science and Technology A, (1999); pp. 986-992.

(Continued)

*Primary Examiner* — Prashant J Khatri
(74) *Attorney, Agent, or Firm* — Robert L. Stearns; Dickinson Wright, PLLC

(57) ABSTRACT

In a method for coating a sliding element, in particular a piston ring or a cylinder liner of an internal combustion engine, DLC phases are embedded into a hard material layer as said hard material layer is deposited. A sliding element, such as a piston ring or a cylinder liner of an internal combustion engine, comprises a hard material layer with embedded DLC phases.

9 Claims, No Drawings

(56) References Cited

OTHER PUBLICATIONS

Rincon C et al: "Tungsten Carbid/Diamond-Like Carbon Multilyer Coatings on Steel for Tribological Applications" Surface and Caotings Technology, Bd. 148, 2001, pp. 277-283.
Voevodin A A et al: "Nanocrystalline Carbide/Amorphous Carbon Composites" Journal of Applied Physics, American Institute of Physics, New York, US Bd. 82, Nr. 2, Jul. 15, 1997, pp. 855-858.

* cited by examiner

METHOD FOR COATING A SLIDING ELEMENT AND SLIDING ELEMENT, IN PARTICULAR A PISTON RING OR CYLINDER LINER OF AN INTERNAL COMBUSTION ENGINE

TECHNICAL FIELD

The invention relates to a method for coating a sliding element, in particular a piston ring or a cylinder liner of an internal combustion engine, and a sliding element.

RELATED ART

Piston rings are used in internal combustion engines in order to provide as perfect a sealing as possible between the piston that moves up and down and the cylinder wall. Furthermore, piston rings serve to wipe off the oil located on the cylinder wall and to maintain the usability of the oil for lubrication. The fundamental requirements placed on piston rings are the lowest possible friction and the longest possible service life under the, in part, extreme conditions during the operation of an internal combustion engine. This implies a wear behavior in which the piston ring meets the requirements placed on it as long as possible. The same applies to the wear behavior of cylinder liners with which the piston rings are in sliding contact.

WO 2007/020139 A1 describes a substrate that may be a piston ring, having an adhesive layer, an intermediate layer of tetrahedral carbon, and an outer layer of amorphous carbon.

DE 10 2005 063 123 B3 of applicant pertains to a sliding element, for example a piston ring which comprises a wear layer and a run-in layer.

SUMMARY OF THE INVENTION

A method is provided for coating a sliding element, in particular a piston ring or a cylinder liner of an internal combustion engine, by which the requirements with regard to both the friction values and the service life are taken into account. Furthermore, a sliding element is provided in which the friction values and a long service life are combined in an advantageous manner.

DETAILED DESCRIPTION

A sliding element, in particular a sliding element of an internal combustion engine, e.g. a piston ring or a cylinder liner, is coated by deposition of a hard material layer. According to an aspect of the invention, DLC phases are embedded in the hard material layer during the deposition, or in other words parallel thereto. The method differs from previously known methods in that the DLC coating is not carried out "on" the hard material layer and/or in a separate coating process, but in parallel and preferably simultaneously with the deposition of the hard material layer such that the described embeddings are formed. The embedding of the DLC phases can also be referred to as "in situ incorporation". It could be found in tests that an advantageous friction behavior is achieved by the parallel presence of the hard material phases and the DLC phases. Furthermore, an advantageous wear behavior could be found. In other words, wear is in a range which ensures a service life in accordance with the requirements. The embedding of the DLC phases moreover makes it possible to provide the hard material layer with different properties along its thickness in an advantageous manner. For instance, the wear behavior on the surface and/or the uppermost layers of the hard material layer can be adjusted such that an advantageous run-in behavior is achieved, while lower-lying areas of the hard material layer are formed by suitable embedding of the DLC phases such that a permanently advantageous wear behavior is achieved.

It has proved to be particularly advantageous to increase the phase content of the DLC phase on the surface and/or in the uppermost 1 to 2 μm of the hard material layer as compared to the remaining coating. This improves the run-in behavior in an advantageous manner.

For the hard material coating, a thickness of at least 10 μm is preferred. The DLC embeddings can thus be provided in the scope that is advantageous for the properties. At the same time, a layer of the aforementioned thickness allows the provision of a run-in layer on the upper side and further layers with specific properties in lower positions.

It is furthermore preferred for the hard material coating to contain nitrides of elements of the $4^{th}$ and/or $5^{th}$ and/or $6^{th}$ subgroup of the periodic table, or even to entirely consist of these. Particularly advantageous properties could be found with the aforementioned elements. A hard material coating of chromium nitride (CrN) is particularly preferred.

This similarly applies with regard to the thermal resistance and/or scuff resistance, which can be improved in the hard material coating according to the invention in that the hard material coating comprises further elements such as, e.g., boron, carbon, oxygen and/or silicon.

The embedded DLC phases can be uniformly distributed. In particular, a phase content between 0.1 and 99.9% can be present in relation to the hard material phase.

As an alternative and/or as a supplement in some areas, the DLC embeddings can be localized such that they have a local phase content of 100% and can in particular constitute a layer of 100% DLC embeddings. Dependent on the requirements, good properties could be found for both of the aforementioned embodiments.

As mentioned above, the phase content of the DLC phases can be varied via the layer thickness of the hard material layer, preferably via one or more gradients. Thus, the properties of the coating can be varied as a whole along the thickness and can be adapted particularly well to the requirements in each case.

The preferred embodiments and the advantages that can be obtained thereby correspond to those which have been described above with reference to the method according to the invention.

The invention claimed is:

1. A coated sliding element comprising a sliding element and a hard material layer, the hard material layer comprises chromium nitride (CrN) with diamond-like carbon (DLC) phases embedded therein, wherein the CrN with the DLC phases embedded therein forms the outermost surface of the coated sliding element,
   wherein the content of the DLC phases is increased at the outermost surface and/or in the uppermost 1 to 2 microns of the hard material layer as compared to the remaining portion of the layer, and wherein the sliding element is a piston ring or a cylinder liner for an internal combustion engine.

2. The sliding element according to claim 1, wherein the hard material layer has a thickness of ≥10 μm.

3. The sliding element according to claim 1, wherein the hard material layer furthermore contains at least one additional element selected from the group of: boron, carbon, oxygen, and silicon.

4. The sliding element according to claim 3, wherein the hard material layer contains boron.

5. The sliding element according to claim 1, wherein the embedded DLC phases are uniformly distributed in a portion below the outermost surface and/or below the uppermost 1 to 2 μm of the hard material layer.

6. The sliding element according to claim 1, wherein the DLC phases have a content between 0.1 and 99.9%.

7. The sliding element according to claim 1, wherein an area of the hard material layer located in the uppermost 1 to 2 μm of the hard material layer includes the DLC phases in an amount up to 100%.

8. The sliding element according to claim 1, wherein the DLC phases have a content that varies via the layer thickness.

9. A coated sliding element comprising a sliding element and a hard material layer, wherein the hard material layer forms an outermost surface of the coated sliding element and the hard material layer consist essentially of chromium nitride (CrN) with diamond-like carbon (DLC) phases embedded therein;

wherein the content of DLC phases is increased at the outermost surface and/or in the uppermost 1 to 2 microns of the hard material layer as compared to the remaining portion of the layer, and wherein the sliding element is a piston ring or a cylinder liner for an internal combustion engine.

* * * * *